United States Patent [19]

Küter, deceased et al.

[11] 4,445,057
[45] Apr. 24, 1984

[54] ROTATING THYRISTOR EXCITATION APPARATUS

[75] Inventors: Heinrich Küter, deceased, late of Bochum, Fed. Rep. of Germany, by Gerda Küter, Marlies Küter, Albert Küter, Rudolf Küter, heirs; Jürgen Klaar, Neukirchen, Fed. Rep. of Germany

[73] Assignee: Kraftwerk Union Aktiengesellschaft, Mülheim, Fed. Rep. of Germany

[21] Appl. No.: 468,553

[22] Filed: Feb. 22, 1983

[30] Foreign Application Priority Data

Feb. 22, 1982 [DE] Fed. Rep. of Germany ....... 3206388

[51] Int. Cl.³ ............................................. H02K 11/00
[52] U.S. Cl. .................................................. 310/68 D
[58] Field of Search ................. 310/68 R, 68 D, 72, 310/75, 84, 159, 160, 168, 169, 171; 363/141, 144, 145; 318/242; 357/74, 81

[56] References Cited

U.S. PATENT DOCUMENTS 3,838,302 9/1974 Dreissigacker et al. ......... 310/68 D
3,965,379 6/1976 Meusel et al. .................... 310/68 R
4,029,981 6/1977 Kuter et al. ....................... 310/68 D
4,079,276 3/1978 Kuter ................................ 310/68 D Primary Examiner—Mark O. Budd
Attorney, Agent, or Firm—Herbert L. Lerner; Laurence A. Greenberg

[57] ABSTRACT

Rotating thyristor excitation apparatus combined with an electrical machine, includes a shaft, a driving collar lying at ground potential and being rotationally fixed relative to the shaft, a first and a second shrouding ring each having inner peripheral surfaces and being disposed on the driving collar, the first shrouding ring having a given axial range, structural thyristor units, heat sinks and protective wiring being disposed on the inner peripheral surface of the first shrouding ring, control units being disposed on the inner peripheral surface of the second shrouding ring and being spatially separated from the structural thyristor units, heat sinks and protective wiring by the driving collar, a direct current collecting ring being attached to and insulated from the shaft within the given axial range of the first shrouding ring, radially inwardly disposed direct current terminals of the structural thyristor units, and radially aligned connecting conductors respectively connected from the direct current terminals to the direct current collecting ring.

20 Claims, 3 Drawing Figures

ROTATING THYRISTOR EXCITATION APPARATUS

The invention relates to a rotating thyristor excitation apparatus combined with an electrical machine, especially turbo generator, in which structural thyristor units together with heat sinks and protective wiring disposed on the inner periphery of a first shrouding ring and control units disposed on the inner periphery of a second shrouding ring, are spatially separated from each other by a common driving collar or hub of the two shrouding rings, which is rotationally fixed relative to a shaft.

Such an apparatus is known from German Published, Prosecuted Application DE-AS No. 23 59 578, corresponding to U.S. Pat. No. 3,965,379. In the prior art device an improved freedom from interference by the drive of the thyristors should be accomplished, in that the power components, disposed on the inner periphery of a first shrouding ring and control units, disposed on the inner periphery of a second shrouding ring, are separated from each other spatially by a common driving collar or hub of both shrouding rings, which acts as electrical shielding. However, the first shrouding ring, which carries the power components on its inner periphery, simultaneously acts as a direct current collecting conductor, which is disposed over the insulated driving collar and is attached to the shaft, and at least one radial current supply bolt is connected with the appropriate direct current conductor, which extends axially in the shaft. The shielding effect of the driving collar or hub is also effected, in that high power currents with voltage peaks are lead through the driving collar and react in a disturbing manner upon the control units.

It is accordingly an object of the invention to provide an apparatus for rotating thyristor excitation, which overcomes the hereinafore-mentioned disadvantages of the heretofore-known devices of this general type, and to further improve the freedom from interference caused by the drive of the thyristors.

With the foregoing and other objects in view there is provided, in accordance with the invention, a rotating thyristor excitation apparatus combined with an electrical machine, especially turbo generator, comprising a shaft, a driving collar lying at ground potential and being rotationally fixed relative to the shaft, a first and a second shrouding ring each having inner peripheral surfaces and being disposed on the common driving collar, the first shrouding ring having a given axial range, structural thyristor units, heat sinks and protective wiring being disposed on the inner peripheral surface of the first shrouding ring, control units being disposed on the inner peripheral surface of the second shrouding ring and being spatially separated from the structural thyristor units, heat sinks and protective wiring by the driving collar, a direct current collecting ring being attached to and insulated from the shaft within the given axial range of the first shrouding ring, radially inwardly disposed direct current terminals of the structural thyristor units, and radially aligned connecting conductors respectively connected from the direct current terminals to the direct current collecting ring.

Through the use of the apparatus for rotating thyristor excitation according to the invention, an unrestricted shielding effect of the driving collar is also accomplished by keeping the spatial separation of power components and control units, in that the driving collar, which is electrically conductively connected with the shaft, lies at earth potential. However, with this consistent shielding of the control units through the driving collar, which is at earth potential, a new solution for the high centrifugal force stresses which are calculated must be simultaneously created for the direct current leakage. On one hand, an insulated direct current collecting ring is provided, which is mounted on the shaft in the axial range of the first shrouding ring, while on the other hand the thyristor components have radially inner direct current terminals, which are connected to the direct current collecting ring over respective radially aligned connecting conductors. The direct current collecting ring is also mounted on the shaft as a separate component with the smallest possible diameter, so that a correspondingly smaller cross section is required and therefore the connecting conductors, which project radially and can be exposed to the cooling air flow, cause additional cooling. Since the direct current terminals are disposed on the inner periphery of the thyristor components, connecting conductors from the direct current collecting ring which are extremely short and only slightly stressed by centrifual force, are ensured.

In accordance with another feature of the invention, the shaft is part of an excitation machine, the driving collar has two sides and is disposed on the shaft, and the second shrouding ring is disposed on one of the sides of the driving collar facing away from the excitation machine or side.

In accordance with a further feature of the invention, the shrouding rings connected to the driving collar are electrically conducting and are at ground potential.

In accordance with an added feature of the invention, the driving collar is attached to the shaft.

In accordance with an additional feature of the invention, the first shrouding ring is shrink-fitted on the outer periphery of the driving collar.

In accordance with again another feature of the invention, the first shrouding ring is formed of an outer capping ring formed of a high density material, and a supporting ring being axially spaced apart from the driving collar.

In accordance with again a further feature of the invention, the second shrouding ring is laterally flanged or screwed to the driving collar.

In accordance with again an added feature of the invention, the inner diameter of the second shrouding ring is smaller than the inner diameter of the first shrouding ring.

In accordance with again an additional feature of the invention, the inner periphery of the second shrouding ring has a polygonal cross section with flat surfaces formed thereon, and a respective one of control units is disposed on each of the flat surfaces.

In accordance with yet another feature of the invention, the thyristor structural units are fastened to the inner peripheral surface of the first shrouding ring in an insulated manner for one current flow direction, and including other thyristor structural units fastened to the inner peripheral surface of the first shrouding ring in an insulated manner for another current flow direction, the direct current collecting ring being associated with one polarity of the thyristor structural units, and including another direct current collecting ring attached to and insulated from the shaft at an axial distance from the first-mentioned direct current collecting ring for another polarity of the thyristor structural units, both of the direct current collecting rings being disposed within the given axial range of the first shrouding ring.

In accordance with yet a further feature of the invention, the first-mentioned and other thyristor structural units are alternately disposed on the first shrouding ring, as seen in the circumferential direction of the first shrouding ring.

In accordance with yet an added feature of the invention, the first-mentioned and other thyristor structural units are staggered on the first shrouding ring, as seen in the axial direction.

In accordance with yet an additional feature of the invention, there is provided an insulating material ring banded to the shaft between the direct current collecting rings.

In accordance with still another feature of the invention, there are provided bands formed of high density or refractory insulation material being disposed on the outer periphery of the direct current collecting rings.

In accordance with still a further feature of the invention, there are provided direct current conductors extended axially in the shaft, radial current supply bolts respectively connected to the direct current conductors, and conductor elements being extended in axial direction and being respectively connected from the radial current supply bolts to the direct current collecting rings.

In accordance with still an added feature of the invention, the shaft has axially directed grooves formed therein, in which the axially extended conductor elements are disposed.

In accordance with still an additional feature of the invention, the radial current supply bolts have heads, and including straps integral with the heads, the conductor elements extended in axial direction being respectively overlapped by and bolted to the straps.

In accordance with another feature of the invention, there are included keys respectively radially outwardly closing the axial grooves, the axially extended conductor elements and the current supply bolts being supported by the keys.

In accordance with a further feature of the invention, the second shrouding ring has a given axial range and an outer peripheral surface, and including a first inductive signal transmission apparatus having a rotating part being fastened to the outer peripheral surface of the second shrouding ring, and a second inductive signal transmission apparatus having a rotating part being fastened to the shaft within the given axial range of the second shrouding ring.

In accordance with a concomitant feature of the invention, the first and second inductive signal transmission apparatus each have a respective stationary part being mechanically connected to each other and being centerable in common.

Other features which are considered as characteristic for the invention are set forth in the appended claims.

Although the invention is illustrated and described herein as embodied in an apparatus for rotating thyristor excitation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
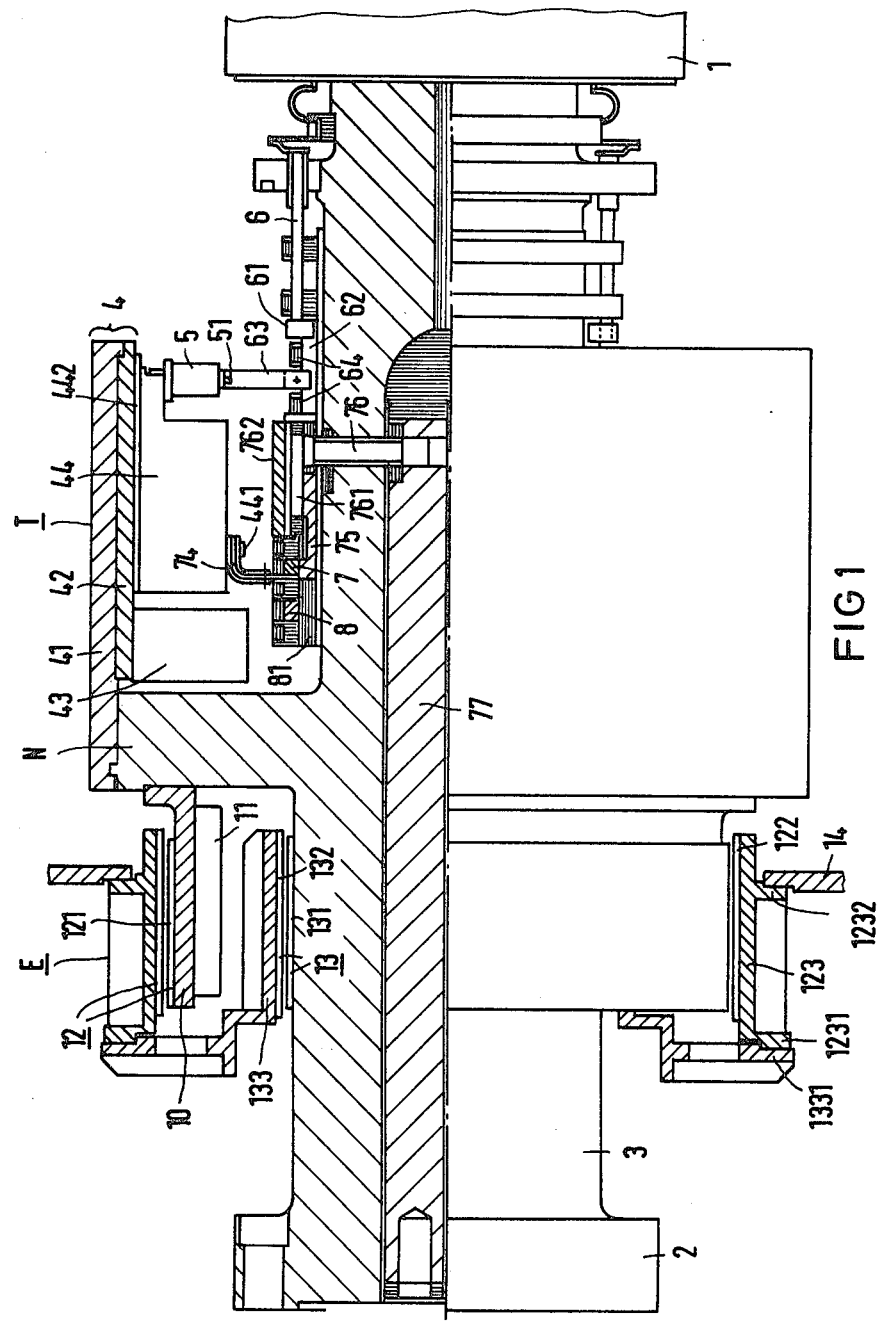
FIG. 1 is a diagrammatic, longitudinal-sectional view of an apparatus for rotating thyristor excitation.

Referring now to the figures of the drawing and first particularly to FIG. 1 thereof there is seen a longitudinal-sectional view through a rotating thyristor exciter, which is disposed on a shaft 3 between the rotor of a three-phase excitation machine 1 and a coupling flange 2, which is provided for connection to the shaft of a turbo generator. The rotating thyristor exciter generally is formed of a thyristor wheel T, which carries all of the power components, and an electronic wheel E, which carries the entire measuring, control, and supply electronics. The thyristor wheel T and the electronic wheel E have a common driving collar or hub N, which is attached to the shaft 3. The common driving collar or hub N is situated over the shaft 3, and an earth or ground brush of the shaft 3, which is not illustrated in the drawing, lies at ground potential so that the measuring, control, and supply electronics of the electronic wheel E are effectively shielded from the disturbing influences of the power components of the thyristor wheel T.

The thyristor wheel T is formed in detail of a first shrouding ring 4, which for its part is assembled of an outer capping ring 41, which is formed of a material having a high tensile strength or density, and a supporting ring 42, which is disposed at an axial distance from the driving collar or hub N. The capping ring 41, which, for example, may be formed of steel and is provided for the absorption of centrifugal forces, is shrink-fitted onto the outer periphery of the driving collar or hub N and onto the outer periphery of the supporting ring 42, in such a manner that the entire first shrouding ring 4 extends in axial direction from the driving collar N toward the three-phase excitation machine 1. On the inner periphery or surface of the supporting ring 42, which for example, is formed of an aluminum alloy with a small modulus of elasticity, circuit components 43 are disposed. The components are associated with the individual thyristors, and situated in the axial region or range next to the driving collar N. The circuit components 43 contain resistors and capacitors of a so-called RC-wiring. These wiring components, which are equally distributed in the circumferential direction, are held through non-illustrated fastening devices, anchored in the supporting ring 42. In the longitudinal-sectional view represented in FIG. 1, there is seen a structural unit 44, which is situated next to the wiring component 43, in the axial region or range toward the three-phase excitation machine 1. The structural unit 44 has a radially inner direct current terminal 441 and a fuse 5 is fastened on its outer front side. The structural unit 44, which is only represented diagrammatically as a block in the drawing, has a thyristor and a heat sink. While, it concerns the heat sink, which is situated radially externally and is connected to the fuse 5 of a current-carrying component, the structural unit 44 is disposed in an insulated manner on the inner periphery of the thyristor wheel T, which is at earth potential. This insulation is provided by an insulation spacer 442, disposed between the structural unit 44 and the supporting ring 42. For mounting the structural unit 44, non-illustrated radial assembly screws are provided, which pass through the structural unit 44 in an insulated manner and which are anchored in the supporting ring 42.

To keep the axial length of the entire rotating thyristor exciter as small as possible, the structural units for both current passage directions of the exciting current are disposed on the inner periphery of the thyristor wheel T. The thyristor-structural unit 44, which is represented in FIG. 1, is assigned to the positive polarity of the excitation current, so that according to FIG. 3, other thyristor-structural units 45 are provided and assigned to the negative polarity of the excitation current. The structural units 44 and 45 are alternately disposed, seen in the circumferential direction of the thyristor wheel T. The thyristor-structural units 45, associated with the negative polarity of the excitation current, have radially inwardly disposed direct current terminals 451 and are insulated by insulation spacers 452 against the supporting ring 42. The structural units 44 and 45 are also displaced, as seen in the axial direction of the thyristor wheel T. This staggered arrangement provides an extremely space-saving construction. Under the condition that the largest width of the structural units 44 and 45, respectively, as seen in the circumferential direction, is given by the diameter of the thyristor disk cells, a sufficient safety zone between the thyristors with smaller diameters of the thyristor wheel T is made possible through staggering. The same applies for the fuses 5, which are fastened on the heat sinks on the open side of the wheel. A line running between radially inwardly disposed terminals 51 of the fuses 5 and the rotor of the three-phase excitation machine 1 is seen from the longitudinal-sectional view in FIG. 1 and partially also from the longitudinal-sectional view in FIG. 2. A three-phase connection line 6, which is equally distributed on the periphery, extends from the rotor of the three-phase excitation machine 1 on the surface of the shaft 3 and is first of all formed as hollow pipes. The connection lines 6 are connected on the side facing the thyristor wheel T by radial connection pieces 61, by carrier brackets 62 disposed on a smaller diameter and insulated from the shaft 3, and by radial terminal straps 63 connected to the terminals 51 of the fuses 5. The centrifugal force stresses are therefore absorbed by insulated bands 64, which are placed on both sides of the terminal straps 63 and the carrier brackets are held fast on the shaft 3. The other current paths extend through the fuses 5, through the heat sinks and through the thyristors of the thyristor-structural units 44 and 45 to the direct current terminals 441 and 451, respectively, seen in FIG. 3.

Figure 2:
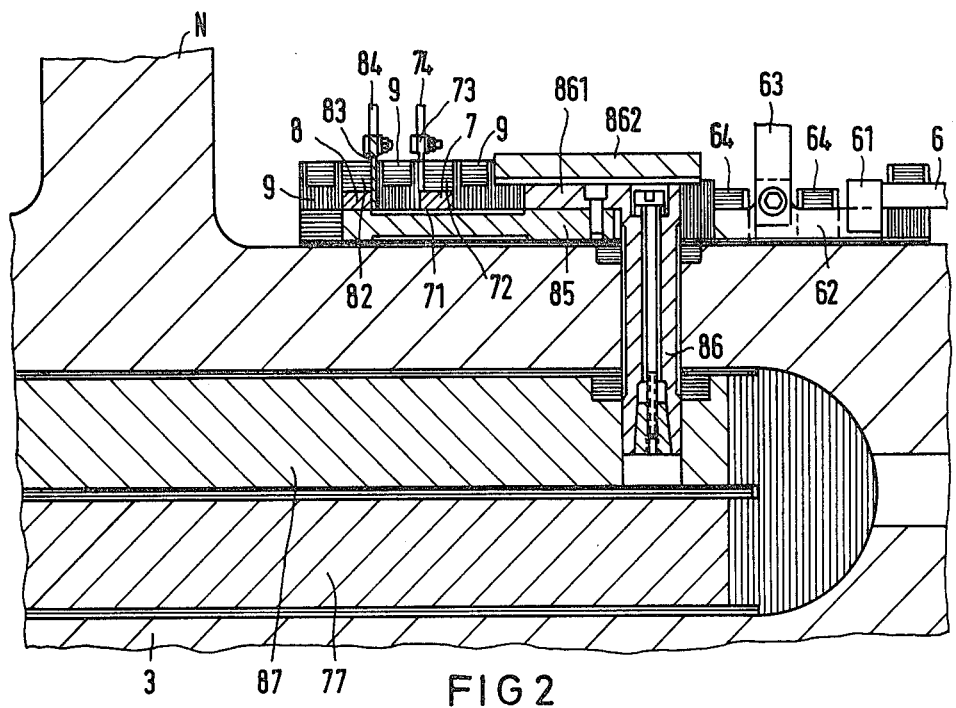
FIG. 2 is a fragmentary longitudinal-sectional view through the shaft in the area of the direct current collecting ring, on a larger scale.
Figure 3:
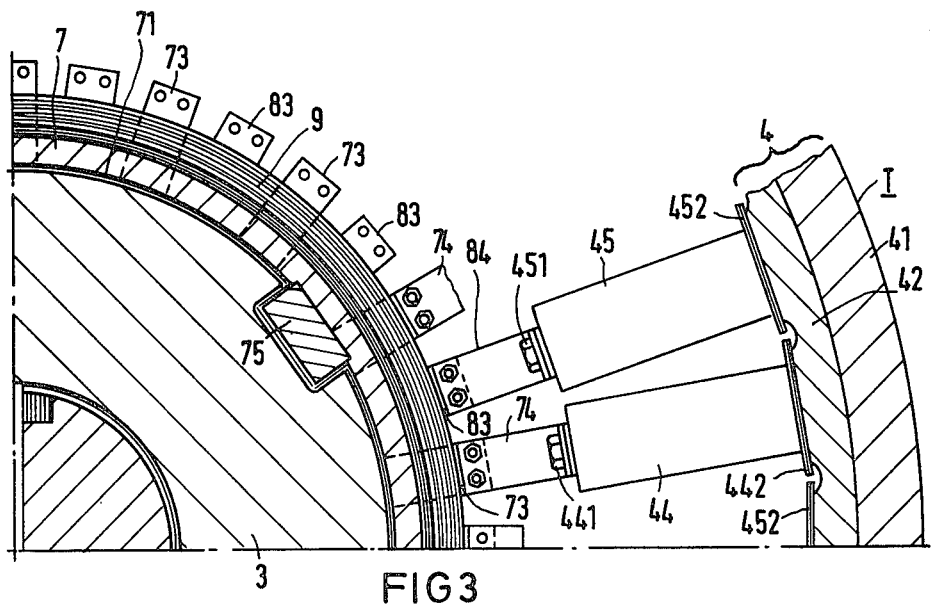
FIG. 3 is a fragmentary, cross-sectional view through the apparatus of FIG. 1 in an axial region, situated between the direct current collecting rings and the current supply bolts belonging thereto, which is likewise on a larger scale.

The direct current system, which connects the direct current terminals 441 and 451 of the thyristor-structural units 44 and 45, respectively, with direct current conductors 77 and 78, respectively, which extend axially in the shaft 3, will be described below with reference to FIGS. 1, 2 and 3. Direct current collecting rings 7 and 8, respectively, are associated with the direct current terminals 441 and 451, which are disposed on the shaft 3 to prevent turning in the axial region of the thyristor wheel T, and are insulated against the shaft 3 by insulation spacers 71 and 81. For radial mounting and for absorption of centrifugal force stresses of the direct current collecting rings 7 and 8, respectively, bands 72 and 82, respectively, which may be formed of glass fiber reinforced synthetics or plastic are provided. Meanwhile, the respective axial mounting and the spacing in the axial direction is guaranteed by a total of three insulating material rings 9, which are banded to the shaft 3 adjacent and between the direct current collecting rings 7 and 8, respectively. Radially projecting terminal straps 73 and 83 are fixedly connected with the direct current collecting rings 7 and 8, respectively. The terminal straps 73 and 83 are equally distributed, as seen in the circumferential direction and are connected to the direct current terminals 441 and 451, respectively, of the thyristor-structural units 44 and 45 through connecting conductors 74 and 84, respectively. These connecting conductors 74 and 84 are therefore aligned in the radial direction and are bent in the axial direction only in the vicinity of the direct current terminals 441 and 451. In order for the structural units 44 and 45 to be easily detached and replaced, the radial connecting conductors 74 and 84 are fastened in a detachable manner. On the other hand, the direct current collecting rings 7 and 8 are connected with the direct current conductors 77 and 87 extending axially in the shaft, by conductor elements 75 and 85 and radial current supply bolts 76 and 86, respectively. Therefore, several of these conductor elements 75 and 85 and radial current supply bolts 76 and 86, which can be displaced in the circumferential direction, are also provided. The conductor elements 75 and 85 are fixedly connected to the inner periphery of the direct current collecting rings 7 and 8, and at the other ends thereof they are overlappingly bolted to straps 761 and 861, which are attached at the heads of the radial current supply bolts 76 and 86, respectively. The conductor elements 75 and 85 therefore extend in axial grooves formed in the shaft 3, whereby these axial grooves, in the region of a shaft chamfer with a large diameter, are radially outwardly closed by keys 762 and 862, respectively. These keys 762 and 862 support the conductor elements 75 and 85 and the radial current supply bolts 76 and 86 radially outwardly against the occuring centrifugal forces. In this way, because of the conductor elements 75 and 85, an axial spacing results between the direct current collecting rings 7 and 8 and the radial current supply bolts 76 and 86 thereof, which can be easily detached, if required, without loosening the direct current collecting rings 7 and 8 from the shaft 3.

The electronic wheel E is formed in detail by a second shrouding ring 10, according to FIG. 1, which is disposed on the side of the driving collar or hub N, that faces away from the three-phase excitation machine 1, and is flanged laterally to the driving collar or hub N. Therefore, the second shrouding ring 10 also lies at ground potential, so that the shielding effect of the driving collar N will be further improved against disturbing influences of the power components of the thyristor wheel T and against the disturbing influences of the three-phase excitation machine 1. On the inner periphery of the second shrouding ring 10, control units 11 are disposed in such a way as to be equally distributed over the periphery so that non-illustrated conductors for the drive of the thyristor pass through the driving collar N in an insulated manner. The inner periphery of the second shrouding ring 10 has the cross-sectional shape of a polygon, so that at each flat surface of the polygon a control unit 11 can be attached with non-illustrated respective fastening devices. Furthermore, it is obvious from the drawing that the inner periphery of the second shrouding ring 10 is smaller than the inner diameter of the first shrouding ring 4. Therefore, for the electronic components placed in the control units 11, substantially smaller centrifugal force stresses result than for the less sensitive power components of the thyristor wheel T. As already mentioned, the electronic wheel E carries the entire measuring, control, and supply electronics contained in the individual control units 11. For the transmission of the measuring and control quantities to the rotating shaft 3 and from the shaft 3 to the installation parts at rest, an inductive signal transmitter is additionally provided. The signal transmitter is disposed on the shaft 3 for one transmission direction and is disposed on the electronic wheel E for the other transmission direction. Through the shielding effect of the driving collar or hub N of the first shrouding ring 4 and the second shrouding ring 10, an undisturbed signal transmission is therefore possible. As seen in the sectional view of FIG. 1, these inductive signal transmitters are formed in particular of a first inductive signal transmission apparatus 12 and a second inductive signal transmission apparatus 13. The rotating part 121 of the first inductive signal transmission apparatus 12 is disposed on the outer periphery of the second shrouding ring 10, while the rotating part 131 of the second inductive signal transmission apparatus 13 is disposed on the shaft 3 in the axial range of the second shrouding ring 10. The stationary parts 122 and 132 of the first and the second inductive signal transmission apparatus 12 and 13 are disposed on the inner periphery of supporting bushings 123 and 133, respectively. The two supporting bushings 123 and 133 in the axial range outside of the second shrouding ring 10 are disposed over flange parts 1231 and 1331, which are concentrically aligned relative to each other and fixedly connected to each other. In this manner, the two supporting bushings 123 and 133 can also be fastened in common to a ring fastener 14 of the machine housing through another flange 1232 of the outer supporting bushing 123 which surrounds the rotating thyristor exciter, and can also be centered in common. Through the supporting bushings 123 and 133, which lie at earth potential, the shielding of the two inductive signal transmission apparatus 12 and 13 is further improved. In addition, through the concentric configuration of the two inductive signal transmission apparatus 12 and 13, the axial structural length of the rotating thyristor exciter can be further reduced.

The rotating parts 121 and 131 and the stationary parts 122 and 132 of the two inductive signal transmission apparatus 12 and 13 may, for example, be formed of a glass fiber reinforced synthetic or plastic, and coils are embedded therein, which are not fully illustrated in the drawing. This accordingly concerns several coils, which are systematically distributed over the periphery and in the axial direction in such a way that in each position of the shaft 3 a constant and undisturbed signal transmission is possible. This signal transmission occurs by means of a voltage frequency conversion in a frequency range of 10 to 100 kHz.

The foregoing is a description corresponding to German Application P No. 32 06 388.1, dated Feb. 22, 1982, the International priority of which is being claimed for the instant application and which is hereby made part of this application. Any discrepancies between the foregoing specification and the aforementioned corresponding German application are to be resolved in favor of the latter.

It is claimed:

1. Rotating thyristor excitation apparatus combined with an electrical machine, comprising a shaft, a driving collar lying at ground potential and being rotationally fixed relative to said shaft, a first and a second shrouding ring each having inner peripheral surfaces and being disposed on said driving collar, said first shrouding ring having a given axial range, structural thyristor units, heat sinks and protective wiring being disposed on said inner peripheral surface of said first shrouding ring, control units being disposed on said inner peripheral surface of said second shrouding ring and being spatially separated from said structural thyristor units, heat sinks and protective wiring by said driving collar, a direct current collecting ring being attached to and insulated from said shaft within said given axial range of said first shrouding ring, radially inwardly disposed direct current terminals of said structural thyristor units, and radially aligned connecting conductors respectively connected from said direct current terminals to said direct current collecting ring.

2. Apparatus according to claim 1, wherein said shaft is part of an excitation machine, said driving collar has two sides and is disposed on said shaft, and said second shrouding ring is disposed on one of said sides of said driving collar facing away from said excitation machine.

3. Apparatus according to claim 1, wherein said shrouding rings connected to said driving collar are electrically conducting and are at ground potential.

4. Apparatus according to claim 1, wherein said driving collar is attached to said shaft.

5. Apparatus according to claim 1, wherein said first shrouding ring is shrink-fitted on the outer periphery of said driving collar.

6. Apparatus according to claim 1, wherein said first shrouding ring is formed of an outer capping ring formed of a high density material, and a supporting ring being axially spaced apart from said driving collar.

7. Apparatus according to claim 1, wherein said second shrouding ring is laterally flanged to said driving collar.

8. Apparatus according to claim 1, wherein the inner diameter of the second shrouding ring is smaller than the inner diameter of the first shrouding ring.

9. Apparatus according to claim 1, wherein the inner periphery of said second shrouding ring has a polygonal cross section with flat surfaces formed thereon, and a respective one of said control units is disposed on each of said flat surfaces.

10. Apparatus according to claim 1, wherein said thyristor structural units are fastened to said inner peripheral surface of said first shrouding ring in an insulated manner for one current flow direction, and including other thyristor structural units fastened to said inner peripheral surface of said first shrouding ring in an insulated manner for another current flow direction, said direct current collecting ring being associated with one polarity of said thyristor structural units, and including another direct current collecting ring attached to and insulated from said shaft at an axial distance from said first-mentioned direct current collecting ring for another polarity of said thyristor structural units, both of said direct current collecting rings being disposed within said given axial range of said first shrouding ring.

11. Apparatus according to claim 10, wherein said first-mentioned and other thyristor structural units are alternately disposed on said first shrouding ring, as seen in the circumferential direction of said first shrouding ring.

12. Apparatus according to claim 11, wherein said first-mentioned and other thyristor structural units are staggered on said first shrouding ring, as seen in the axial direction.

13. Apparatus according to claim 10, including an insulating material ring banded to said shaft between said direct current collecting rings.

14. Apparatus according to claim 13, including bands formed of high density insulation material being disposed on the outer periphery of said direct current collecting rings.

15. Apparatus according to claim 10, including direct current conductors extended axially in said shaft, radial current supply bolts respectively connected to said direct current conductors, and conductor elements being extended in axial direction and being respectively connected from said radial current supply bolts to said direct current collecting rings.

16. Apparatus according to claim 15, wherein said shaft has axially directed grooves formed therein, in which said axially extended conductor elements are disposed.

17. Apparatus according to claim 16, wherein said radial current supply bolts have heads, and including straps integral with said heads, said conductor elements extended in axial direction being respectively overlapped by and bolted to said straps.

18. Apparatus according to claim 17, including keys respectively radially outwardly closing said axial grooves, said axially extended conductor elements and said current supply bolts being supported by said keys.

19. Apparatus according to claim 1, wherein said second shrouding ring has a given axial range and an outer peripheral surface, and including a first inductive signal transmission apparatus having a rotating part being fastened to said outer peripheral surface of said second shrouding ring, and a second inductive signal transmission apparatus having a rotating part being fastened to said shaft within said given axial range of said second shrouding ring.

20. Apparatus according to claim 19, wherein said first and second inductive signal transmission apparatus each have a respective stationary part being mechanically connected to each other and being centerable in common.

* * * * *